INVENTORS
VEIJO K. PAINE
EDWIN H. SCHMIDT
BY Charles J. Ungemach
ATTORNEY

INVENTOR
VEIJO K. PAINE
EDWIN H. SCHMIDT
BY Charles J. Ungemach
ATTORNEY

INVENTOR
VEIJO K. PAINE
EDWIN H. SCHMIDT
BY Charles J. Ungemach
ATTORNEY

United States Patent Office 3,460,110
Patented Aug. 5, 1969

3,460,110

MAGNETIC LOGIC CIRCUITRY EMPLOYING CORES HAVING SHIFTED HYSTERESIS LOOPS

Veijo K. Paine, Minneapolis, and Edwin H. Schmidt, Hopkins, Minn., assignors to Honeywell Inc., Minneapolis, Minn., a corporation of Delaware Filed Oct. 15, 1965, Ser. No. 496,318
Int. Cl. G11b 5/62
U.S. Cl. 340—174 17 Claims

ABSTRACT OF THE DISCLOSURE

Logic circuits employing magnetic cores having inherently shifted hysteresis loops. Because of the inherent bias of such cores fewer windings are required and power requirements are reduced.

The present invention pertains to magnetic core circuits and more particularly magnetic core circuits with a minimum number of windings, high operating frequency, high signal to noise ratio, and minimum power require ments.

To reduce the power requirements, magnetic circuits have been developed which use no semiconductor components. For example, in shift registers, it has been possible to eliminate diodes by relegating their function to additional magnetic cores. As a result, it has been possible to reduce the current requirements previously demanded by the diodes and in turn reduce the size of the magnetic cores whose dimensions are dictated by the magnitude of the current in their windings.

When a number of cores are connected to form a logic circuit, such as a shift register, a change of the magnetic state of one core will have an effect on the state of adjacent cores. This is true because with magnetic cores heretofore used in the art the coercive force in the direction required to set a core to a binary "1" state is equal in magnitude to the coercive force in the direction required to reset the core to a binary "0" state. Although without this transfer phenomena the operation of logic circuits would not be possible, there are times when such signal transfer is undesirable and must be suppressed. It is generally desirable to allow transfer in a first direction called "forward transfer" and to block the transfer in a second direction called "back transfer." This is conventionally accomplished by placing additional windings on the cores and by applying biasing signals which promote the forward transfer and block the undesirable back transfer.

The present invention provides an improvement in such circuits by using magnetic cores with the square loop hysteresis characteristic which is shifted along the H-axis. For such a core with the shifted hysteresis loop, the coercive force in the direction required to set the core is different in magnitude than the coercive force in the direction required to reset the core. By using the cores with shifted hysteresis loops, a number of important advantages may be realized. It is possible to obtain the same quality of operation as in the past, but with fewer number of windings. The fact that fewer windings may be used is in itself a great advantage. Another advantage which directly results from the elimination of some of the windings is the reduction in the required power which was necessary to energize the windings now eliminated.

In the alternative, it is possible to improve the operation of the magnetic logic circuits by retaining the same number of windings as previously used but replacing the cores with the type having shifted characteristics. This will allow large reductions in power consumption. Computations indicate an increase in frequency range of as much as 50 percent and more. Another advantage is the improvement possible in the signal to noise ratio.

Magnetic core material in which the inherent characteristic gives it the shifted hysteresis loop has recently been developed and tested. The process of making such cores ideally susceptible to application such as discussed here is the subject of copending application Ser. No. 490,223 in the name of James O. Holmen and assigned to the assignee of the present invention. The application is entitled "Control Apparatus and has been mailed to the Patent Office on Sept. 24, 1965. The one method which has been successfully used to achieve the shifted characteristic will be explained below.

It has been found that electrolessly deposited NiCoP (nickel-cobalt-phosphorous) is one type of magnetic material which can be processed to exhibit an intrinsically shifted hysteresis loop. Predictable intrinsic biasing of the coercive force may be accomplished during the annealing of the magnetic material by applying a DC orientating current.

A film of magnetic material is plated by a chemical process on a substrate, which may be some plastic material. Immediately after plating, no orientation exists within the plated magnetic material and the material has no significant permeability. To give the plated core material the square hysteresis loop characteristics, the material must be annealed. This involves treating the core material in a temperature chamber in an environment any where from 140 degrees C. to 170 degrees C.—depending upon the properties desired. To give the magnetic material a shifted hysteresis loop, a winding is placed on the core material and a DC current is directed through the winding during the annealing process. The current in the winding sets up a circumferential H field in the core.

While before the annealing of the material, the orientation of the domains in the magnetic medium was random, by the annealing process, the domains have been ordered in a circumferential direction and the material has been endowed with a square loop characteristic. As a result of the DC current applied during the annealing process, the hysteresis loop of the magnetic material is shifted along the H axis such that a larger H field is required to switch the magnetic material in one direction than in the other. The smaller H is in the same direction as the applied H vector resulting from the DC current during the annealing process. A material now exists which has two different coercivities. Hysteresis loop shift has been obtained by this process which results in unidirectional coercivity ratios of greater than 4:1.

The present invention teaches how magnetic cores with shifted hysteresis loops can be beneficially utilized in magnetic logic circuits. Specific examples are given here showing application in shift registers, AND gates, and OR gates. The function of magnetic cores in various different types of logic circuits, however, is very similar and the study of the examples shown here will give anyone skilled in the art a clear teaching of how the cores may be utilized in other logic circuits.

It is, therefore, an object of the present invention to provide improved magnetic core logic circuits.

A more specific object of the present invention is to provide logic circuts with a reduced number of windings and reduced power requirements.

A further object of the present invention is to provide magnetic logic circuits with a high frequency of response.

These and further objects of the present invention will become apparent to those skilled in the art upon examination of the specification, claims, and drawings, in which:

Figure 6A:
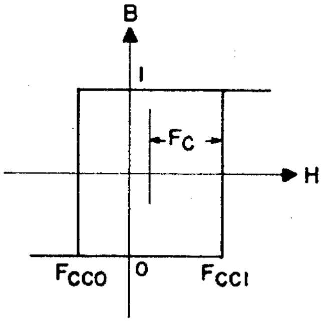
Figure 6B:
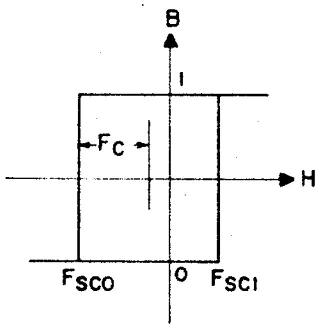
Figure 7:
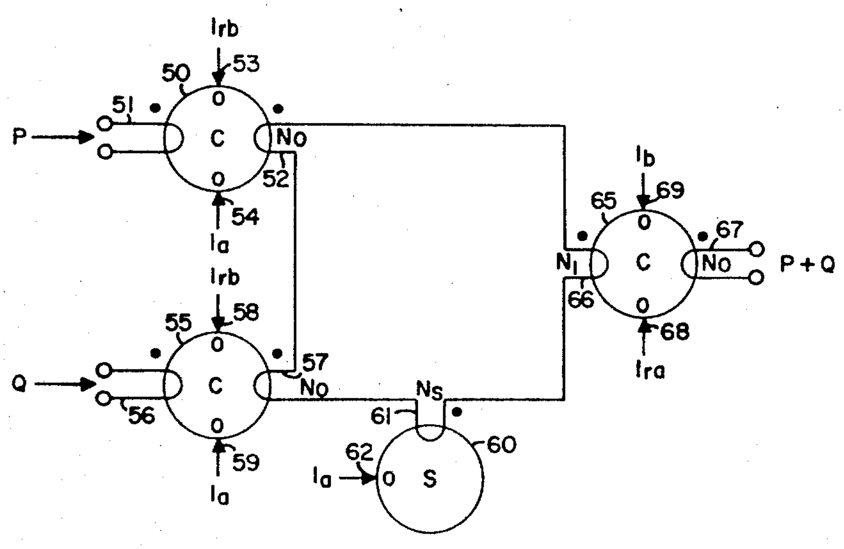

FIGURES 6*a* and 6*b* show hysteresis characteristics for cores having different directions of shift;

FIGURE 7 shows an OR gate using the cores with the shifted characteristics; and

Figure 8:
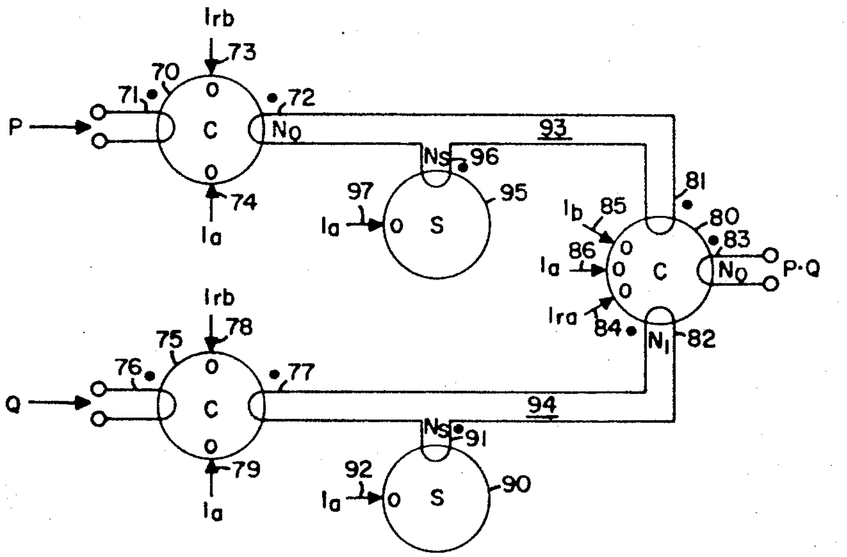

FIGURE 8 illustrates an AND gate using the cores with the shifted characteristics.

Figure 1:
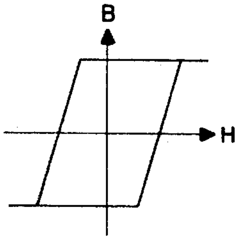
FIGURE 1 is a graphical representation of the hysteresis characteristics for magnetic materials conventionally used in magnetic logic circuits.
Figure 2:
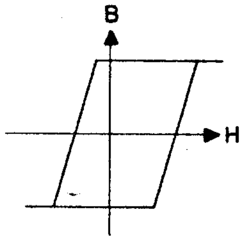
FIGURE 2 illustrates graphically the hysteresis characteristics of magnetic material exhibiting an inherent shift.
Figure 3:
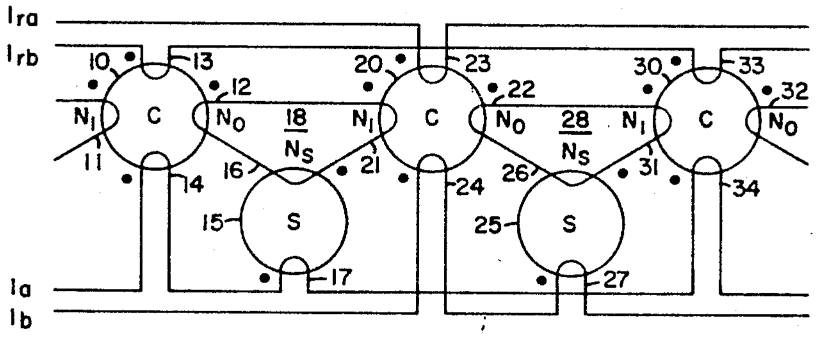
FIGURE 3 illustrates a magnetic shift register wherein magnetic cores with shifted characteristics may be used to give improved operation.

Referring now to FIGURE 3, a magnetic shift register is shown having coupling cores 10, 20, and 30 and storage cores 15 and 25. The coupling cores are made of magnetic material whose inherent shift is such that it is easier to shift the core into a "0" state than it is to shift it into a "1" state. The characteristic of these cores is illustrated in FIGURE 6*a*. Storage cores 15 and 25 are made of magnetic material whose inherent hysteresis shift is such that it is easier to shift the core in to a "1" state and it is more difficult to shift it into a "0" state. The characteristic of these cores is illustrated in FIGURE 6*b*.

Figure 4:
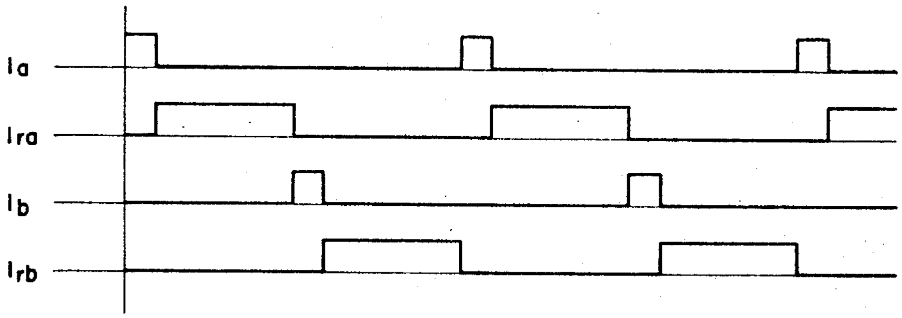
FIGURE 4 illustrates the relative timing of current pulses employed for operating the circuit of FIGURE 3.

Coupling core 10 has an input winding 11, an output winding 12, a reset winding 13, and a feedback winding 14. Coupling core 20 has an input winding 21, an output winding 22, a reset winding 23, and a feedback winding 24. Coupling core 30 has an input winding 31, an output winding 32, a reset winding 33, and a feedback winding 34. Storage core 15 has a control winding 16 and a drive winding 17 and storage core 25 has a control winding 26 and a drive winding 27. Output winding 12 of coupling core 10, control winding 16 of storage core 15, and input winding 21 of coupling core 20 are connected in series manner to form a single closed coupling loop 18. Output winding 22 of coupling core 20, control winding 26 of storage core 25, and input winding 31 of coupling core 30 are connected in a series manner to form a single closed loop 28. Reset windings 13 and 33 of coupling cores 10 and 30 respectively are connected in series and are adapted to receive current pulse signal $I_{rb}$ from a pulse generator not shown. Reset winding 23 of coupling core 20 is connected to receive a current pulse signal $I_{ra}$. Feedback winding 14 of coupling core 10, winding 17 of storage core 15 and feedback winding 34 of coupling core 30 are connected in series and are adapted to receive a current pulse signal $I_a$. Feedback winding 24 of coupling core 20 and winding 27 of storage core 25 are connected in series and are adapted to receive a current pulse signal $I_b$. Current pulse signals $I_a$, $I_{ra}$, $I_b$, and $I_{rb}$ and their proper relationships to each other are illustrated in FIGURE 4.

By merely looking at this circuit of FIGURE 3, the novelty will not become apparent. Circuits with very similar external appearances may be found in prior art. The novelty, however, is in the use of magnetic cores with shifted hysteresis loops. This is not found in any of the prior art. The operation and the advantages obtained through use of these magnetic cores with shifted loops will become apparent from the description below.

Assume storage core 15 is in a "1" state, and all of the other cores are in a "0" state. Drive phase A clears storage core 15 to a "0" state. The output voltage on control winding 16 of storage core 15 causes current to flow in coupling loop 18 which drives coupling core 20 to a "1" state. The voltage on output winding 22 of coupling core 20 causes current to flow in coupling loop 28 which drives storage core 25 to a "1" state. Coupling core 30 is prevented from switching to the "1" state by $I_a$ which is applied directly to core 30 through feedback winding 34. Coupling core 20 and storage core 25 are now in a "1" state and storage core 15 is in a "0" state.

Coupling core 20 is cleared back to a "0" state by $I_{ra}$ applied to reset winding 23 on core 20. $I_{ra}$ is a long duration, low amplitude current pulse so that the voltage induced on input winding 21 and output winding 22 of coupling core 20 does not set up sufficient currents in coupling loops 18 and 28 to disturb storage cores 15 and 25. Storage core 25 is now the only core set to a "1" state. For ring counter operation (i.e., two cores per bit) the information has propagated through one bit. For shift register operation (i.e., four cores per bit) the information has propagated through one half bit.

The information now travels from storage core 25 through coupling core 30 into the next storage core down the line (not shown here) during drive phase B. $I_{rb}$ resets coupling core 30 and the cycle repeats.

The operating speed of this circuit is limited by the m.m.f. (magnetomative force) developed on storage core 25 when coupling core 20 is reset by $I_{ra}$. When this m.m.f. equals the coercive m.m.f. ($F_c$) of the storage core, partial switching occurs and proper circuit operation cannot be maintained.

The principle of operation of the shift register, as so far described, is the same as for a conventional shift register with ordinary cores. A consideration will now be given to the effect on the operation of the cores with shifted hysteresis loops. For optimum operation, the hysteresis loops of the coupling cores are as shown in FIGURE 6*a*, so that it is easier to shift the cores into the "0" state and more difficult to shift the core into the "1" state. The characteristics of the storage cores are shifted in the opposite direction as shown in FIGURE 6*b*. For best operation, the core characteristics should meet the following conditions:

$$F_{cc1} > F_{cco};\ F_{sco} > F_{sc1}$$
$$F_{cc1} + F_{cco} \cong F_{sc1} + F_{sco}$$

$F_{cco}$ is not necessarily equal to $F_{sc1}$.

Since $N_o > N_s > N_1$ in a typical design, improvements in operating frequency, power requirements, and operational tolerance can be relaized over the conventional shift register having the same number of feedback windings.

For the storage cores with $$F_{sco} + F_{sc1} = 2F_{sc}$$

the amount of shift for optimum frequency response is governed by the following equations:

$$F_{sco} = \frac{2F_{cc}N_o}{N_1 + N_o};\ F_{sc1} = \frac{2F_{cc}N_1}{N_1 + N_o}$$

For the coupling core with $$F_{cco} + F_{cc1} = 2F_{cc}$$

the amount of shift is established by the power requirements. In general, it is desirable to make $F_{cco}$ as small as possible for minimum power requirements. With this circuit, maximum operational frequency is increased by up to 50 percent. Also, for low frequencies the reset current or power requirement is reduced to $F_{cco}/F_{cc}$ of what it was for the conventional circuit. At the highest operating frequency, the reset current or power requirement can be reduced to as low as 67 percent of the requirement for the same circuit with the regular magnetic cores.

Figure 5:
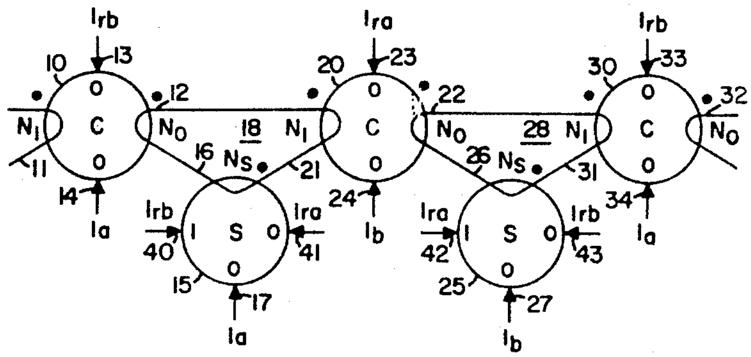
FIGURE 5 illustrates an alternate embodiment of a shift register giving further improvements in operation.

In FIGURE 5, a second embodiment of the shift register is illustrated. This embodiment is very similar to the embodiment of FIGURE 3 with the exception that for improved operation of a pair of additional windings are placed on each storage core. To simplify the schematic diagram, the representation of the feedback and the reset windings is made by arrows pointing to the cores to which a particular signal is applied together with a notation showing whether the application of this signal to the core tends to drive the core into the "0" or into the "1" state. As will be noted, by comparison with FIGURE 3, the only difference in the circuit is that additional feedback windings 40 and 41 are placed on storage core 15 and additional feedback windings 42 and 43 are placed on storage core 25. This circuit functions in the same manner as the conventional circuit without the additional feedback. The feedback is applied to storage cores 15 and 25, as well as to all other storage cores of the shift register of which the illustration in FIGURE 5 represents only a section. The purpose of the feedback is to prevent the storage cores from switching when the coupling cores are being cleared by $I_{ra}$ or $I_{rb}$.

By applying the feedback m.m.f. to the storage cores such that $$0<|F_{ra}|<F_c;\ 0<|F_{rb}|F_c$$

the effective thresholds of the storage cores can be doubled. Therefore, the limiting frequency is doubled since the coupling cores can be cleared in half the time required without the feedback. Additional improvements can be had by using magnetic cores with shifted hysteresis loops. The following inequalities are called for the feedback m.m.f.'s to the storage cores:

$$0<|F_{ra}|<F_{sc1} \text{ and } 0<|F_{rb}|<F_{sco}$$

for storage core 25 and $$0<|F_{rb}|<F_{sc1} \text{ and } 0<|F_{ra}|<F_{sco}$$

for storage core 15.

Comparing the operation of this circuit to the conventional circuit with feedback, the reset current may be reduced to $F_{cco}$ over $F_c$ of conventional for low frequencies. At the highest operating frequency, the reset current can be reduced to as low as $$\frac{2}{2+k}$$

75 percent of the requirement for the conventional circuit with the additional feedback on the storage cores.

As stated before, the function of magnetic cores in various logic circuits is very similar and the cores with shifted hysteresis loops used according to the teaching of the present disclosure produce similarly beneficial results. In FIGURE 7 is illustrated a magnetic OR circuit incorporating this improvement.

The circuit in FIGURE 7 is shown comprising coupling cores 50, 55, and 65 and storage core 60. Storage core 60 and coupling core 65 are the basic blocks of the OR circuti while coupling cores 50 and 55 could represent the outputs of other logic circuits such as the shift register discussed before. Coupling core 50 has input winding 51 and output winding 52, a reset winding 53 and a feedback winding 54. Coupling core 55 has an input winding 56 and an output winding 57, a reset winding 58, and a feedback winding 59. Storage core 60 has a control winding 61 and a drive winding 62, while coupling core 65 has an input winding 66 and output winding 67, a reset winding 68, and a feedback winding 69.

When an input exists at winding 51 on coupling core 50 "OR" on winding 56 on coupling core 55 during drive B, a negative voltage is induced on the undotted side of output winding 52 or 57. This voltage generates a current in the coupling loop comprised of a series connection of output windings 52 and 57, control winding 61, and input winding 66. The current goes into the undotted ends of the input winding 66 of coupling core 65, and control winding 61 of storage core 60. The m.m.f. generated is in a direction to set both coupling core 65 and storage core 60 to a "1" state. However, only storage core 60 is set since $I_b$ applied to winding 69 of coupling core 65 prevents core 65 from switching. $I_{rb}$ is then applied to winding 53 and 58 of coupling cores 50 and 55 respectively, resetting these cores to the "0" state. If storage core 60 does not exhibit a shifted hysteresis loop, $I_{rb}$ must also be applied to storage core 60 to prevent it from switching towards the "0" state.

When drive $I_a$ is applied to winding 62 of storage core 60, storage core 60 is cleared to the "0" state. This generates a positive voltage on the dot side of control winding 61. The voltage sets up a current in the coupling loop which sets coupling core 65 to a "1" state. An output is then generated on the output winding 67 of coupling core 65 and the "OR" function is complete. Reset pulse $I_{ra}$ is then applied to reset winding 68 of coupling core 65 to reset it to the "0" state. For additional improvement in the operation of the circuit, a feedback signal $I_{ra}$ may also be applied to an additional winding not shown on storage core 60, to prevent core 60 from switching towards the "1" state. Again, as discussed above with reference to the shift register, the operating frequency limit of the circuit is in most part determined by the time required to reset the coupling cores. Due to the shifted hysteresis loop, the cores used here can be reset in less time and the operating frequency of the circuit can be substantially increased. And also, as discussed above, it is possible to achieve a corresponding reduction in power consumption.

Another example is shown in FIGURE 8, where the present invention is incorporated into an AND circuit. There is shown a circuit comprised of magnetic coupling cores 70, 75, and 80, and magnetic storage cores 85 and 90. Coupling core 70 has an input winding 71, an output winding 72, a reset winding 73, and a feedback winding 74. Coupling core 75 has an input winding 76, an output winding 77, a reset winding 78, and a feedback winding 79. Coupling core 80 has a pair of input windings 81 and 82, an output winding 83, a reset winding 84, and feedback windings 85 and 86. Storage core 95 has a control winding 96 and a drive winding 97, while storage core 90 has a control winding 91 and a drive winding 92. Output winding 72 of coupling core 70, control winding 96 of storage core 95, and input winding 81 of coupling core 80 are connected in a series fashion to form a current loop 93. Output winding 77 of coupling core 75, control winding 91 of storage core 90, and input winding 82 of coupling 80 are connected in a series fashion to form a current loop 94. Coupling cores 70, 75, and 80 have a shifted characteristic hysteresis loop of the type shown in FIGURE 6*a* and storage cores 95 and 90 have a shifted hysteresis loop of the type shown in FIGURE 6*b*.

When an input exists during phase B at input windings 71 and 76 of coupling cores 70 and 75 respectively, negative voltages are generated on the dot end of the output windings 72 and 77 respectively. The currents flowing in coupling loops 93 and 94 switch storage cores 95 and 90 to a "1" state. Coupling core 80 is prevented from being switched to a "1" state by $I_b$. Coupling cores 70 and 75 are then reset with signal $I_{rb}$ applied to reset windings 73 and 78 respectively. To prevent storage core 95 or 90 from being switched towards the "0" state when coupling cores 70 and 75 are cleared, $I_{rb}$ may be applied to storage cores 95 and 90 through additional windings not shown in FIGURE 8. Drive phase A is then applied to storage cores 95 and 90 clearing them to a "0" state. The induced voltage on the control windings of the storage cores causes current to flow in coupling loops 93 and 94. The total M.M.F. on coupling core 80 exceeds the inhibiting effect of $I_a$ applied on winding 86 of core 80. As a result, core 80 is switched to a "1" state and an output is delivered to output windings 83 of core 80. If only one of the two storage cores 95 and 90 has been set, the m.m.f. drive on coupling core 80 would not have been great enough to overcome the $I_a$ inhibit on winding 86 of coupling core 80 and no output would occur. $I_{ra}$ applied to reset winding 84 to reset core 80. $I_{ra}$ signal may also be applied to storage cores 95 and 90 at additional windings not shown in FIGURE 8, to prevent them from being switched toward a "1" state when coupling core 80 is cleared back to "0" state. In view of the shifted hysteresis loops of storage cores 95 and 90, however, these additional feedback windings are not necessary and excellent operation of the circuit may be obtained without them. All of the advantages enumerated with reference to the previous circuits are also obtained here.

Clearly, many variations and embodiments are possible within the spirit of this invention. It is, therefore, understood that the specific embodiment of my invention shown here is for the purpose of illustration only, and that my invention is limited only by the scope of the appended claims.

We claim:

1. A magnetic logic circuit comprising:
a plurality of magnetic cores each having first and second stable magnetic states, at least some of said cores having inherently shifted magnetic characteristics such that the coercive force required to set them into said first magnetic state is of substantially different magnitude than the coercive force required to set them into said second magnetic state;
at least one winding on each said magnetic core; and circuit means interconnecting said windings.

2. A magnetic logic circuit comprising:
a storage magnetic core having a first and a second stable magnetic state;
a coupling core associated with said storage core, said coupling core having a square loop magnetic characteristic with a first and a second stable magnetic state, said coupling core being further characterized by an inherent shift in its magnetic characteristic loop such that the coercive force required to switch it into said first magnetic state is substantially less than the force required to switch it into said second state;
a control winding on said storage core;
an input, an output and a reset winding on said coupling core, said reset winding being adapted to receive a signal for resetting said core to said first magnetic state; and
circuit means interconnecting the output winding of said coupling core with said control winding of said storage core.

3. A magnetic logic circuit comprising:
a storage magnetic core having a square loop magnetic characteristics with a first and a second stable magnetic state, said storage core being further characterized by an inherent shift in its magnetic characteristic loop such that the coercive force required to switch it into said second magnetic state is substantially less than the force required to switch it into said first state;
a coupling magnetic core associated with said storage core, said coupling core having a first and a second stable magnetic core;
a control winding on said storage core;
an input, an output and a reset winding on said coupling core, said reset winding being adapted to receive a signal for resetting said core to said first magnetic state; and
circuit means interconnecting the output winding of said coupling core with said control winding of said storage core.

4. A magnetic logic circuit comprising:
a plurality of storage magnetic cores each having a first and a second stable magnetic state;
a plurality of coupling cores one associated with each said storage core, each said coupling core having a square loop magnetic characteristic with a first and a second stable magnetic state, each said coupling core being further characterized by an inherent shift in its magnetic characteristic loop such that the coercive force required to switch it into said first magnetic state is substantially less than the force required to switch it into said second state;
a control winding on each said storage core;
an input, an output and a reset winding on each said coupling core said reset winding being adapted to receive a signal for resetting said core to said first magnetic state; and
circuit means interconnecting the output winding of each said coupling core with said control winding of its associated core and with the input winding of a coupling core associated with another storage core.

5. A magnetic logic circuit comprising:
a plurality of storage magnetic cores each having a square loop magnetic characteristic with a first and a second stable magnetic state, each said storage core being further characterized by an inherent shift in its magnetic characteristic loop such that the coercive force required to switch it into said second magnetic state is substantially less than the force required to switch it into said first state;
a plurality of coupling magnetic cores, one associated with each said storage core, said coupling cores having a first and a second stable magnetic state;
a control winding on said storage core;
a input, an output and a reset winding on said coupling core, said reset winding being adapted to receive a signal for resetting said core to said first magnetic state; and
circuit means interconnecting the output winding of said coupling core with said control winding of said storage core.

6. A magnetic logic circuit comprising:
a plurality of storage magnetic cores each having a first and a second stable magnetic state, said cores being further characterized by an inherent shift in their square loop magnetic characteristics such that the coercive force required to switch it into said first magnetic state is substantially greater than the force required to switch it into said second state;
a plurality of coupling magnetic cores, one associated with each said storage core, said coupling cores each having a first and a second stable magnetic state and each being further characterized by an inherent shift in its magnetic characteristic such that the coercive force required to switch it into said first magnetic state is substantially less than the force required to switch it into said second state;
a control winding associated with each said storage core;
an input, an output and a reset winding associated with each said coupling core; and
circuit means connecting the control winding of each said storage core with the output winding of the associated coupling core and the input winding of the coupling core associated with another storage core of said logic circuit.

7. A magnetic shift register comprising:
a plurality of storage magnetic cores each having a first and a second stable magnetic state;
a plurality of coupling magnetic cores, one associated with each storage core, said coupling cores each having a first and a second stable magnetic state and each being further characterized by an inherent shift in its magnetic characteristic such that the coercive force required to switch it into said first magnetic state is substantially less than the force required to switch it into said second state;
a control winding associated with each said storage core;
an input, an output and a reset winding associated with each said coupling core; and
circuit means connecting the control winding of each said storage core with the output winding of the associated coupling core and the input winding of the coupling core associated with the next succeeding storage core of said shift register.

8. A magnetic shift register comprising:
a plurality of storage magnetic cores each having a first and a second stable magnetic state, said cores being further characterized by an inherent shift in their square loop magnetic characteristics such that the coercive force required to switch it into said first magnetic state is substantially greater than the force required to switch it into said second state;
a plurality of coupling magnetic cores, one associated with each said storage core, said coupling cores each having a first and a second stable magnetic state;

a control winding associated with each said storage core;

an input, an output and a reset winding associated with each said coupling core; and circuit means connecting the control winding of each said storage core with the output winding of the associated coupling core and the input winding of the coupling core associated with another storage core of said logic circuit.

9. A magnetic shift register comprising:

a plurality of storage magnetic cores each having a "0" and a "1" stable magnetic state, each said core being further characterized by an inherent shift in its square loop magnetic characteristics such that the coercive force required to switch it into said "0" magnetic state is substantially greater than the force required to switch it into said "1" state;

a plurality of coupling magnetic cores, one associated with each said storage core, said coupling cores each having a "0" and a "1" stable magnetic state and each being further characterized by an inherent shift in its magnetic characteristic such that the coercive force required to switch it into said "0" magnetic state is substantially less than the force required to switch it into said "1" state;

a control winding associated with each said storage core;

an input, an output and a reset winding associated with each said coupling core; and circuit means connecting the control winding of each said storage core with the output winding of the associated coupling core and the input winding of the coupling core associated with the next succeeding storage core of said shift register.

10. A magnetic "OR" circuit comprising:

a storage magnetic core having a first and a second stable magnetic state;

a pair of input coupling magnetic cores and an output coupling magnetic core said coupling cores having square loop magnetic characteristics with a "0" and a "1" stable magnetic state, said coupling cores being further characterized by an inherent shift in their magnetic characteristic loops such that the coercive force required to switch them into their "0" state is substantially less than the force required to switch them into their "1" state;

a control winding on said storage core;

an input, an output and a reset winding on each said coupling core being adapted to receive a signal for resetting said coupling cores into their "0" after completion of a logic operation; and circuit means for interconnecting said output windings of said input coupling cores, said control winding of said storage core and said input winding of said output coupling core to form a single coupling current loop.

11. A magnetic "OR" circuit comprising:

a storage magnetic core having square loop magnetic characteristics with a "0" and a "1" stable magnetic state, said storage core being further characterized by an inherent shift in its magnetic characteristic loop such that the coercive force required to switch it into its "1" state is substantially less than the force required to switch it into its "0" state;

a pair of input coupling magnetic cores and an output coupling magnetic core said coupling cores having square loop magnetic characteristics with a "0" and a "1" stable magnetic state, said coupling cores being further characterized by an inherent shift in their magnetic characteristic loops such that the coercive force required to switch them into their "0" state is substantially less than the force required to switch them into their "1" state;

a control winding on said storage core;

an input, an output and a reset winding on each said coupling core, said reset winding of each said coupling cores into their "0" after completion of a logic operation; and circuit means for interconnecting said output windings of said input coupling cores, said control winding of said storage core and said input winding of said output coupling core to form a single coupling current loop.

12. A magnetic "OR" circuit comprising:

a storage magnetic core having a "0" and a "1" stable magnetic state, said core being further characterized by an inherent shift in its square loop magnetic characteristic such that the coercive force required to switch it into said "0" magnetic state is substantially greater than the force required to switch it into said "1" state;

a plurality of input coupling magnetic cores and an output coupling magnetic core said coupling cores having square loop magnetic characteristics with a "0" and a "1" stable magnetic state, said coupling cores being further characterized by an inherent shift in their magnetic characteristic loops such that the coercive force required to switch them into their "0" state is substantially less than the force required to switch them into their "1" state;

a control winding on said storage core;

said coupling core, said reset winding of each said coupling core being adapted to receive a signal for resetting said coupling cores into their "0" after completion of a logic operation; and circuit means for interconnecting said output windings of said input coupling cores, said control winding of said storage core and said input winding of said output coupling core to form a single coupling current loop.

13. A magnetic "OR" circuit comprising:

a storage magnetic core having a "0" and a "1" stable magnetic state and being further characterized by an inherent shift in its magnetic characteristic such that the coercive force required to switch it into said "0" magnetic state is substantially greater than the force required to switch it into said "1" state;

a plurality of input coupling magnetic cores and an output coupling magnetic core said coupling cores having square loop magnetic characteristics with a "0" and a "1" stable magnetic states;

a control winding on said storage core;

an input, an output and a reset winding on each said coupling core, said reset winding of each said coupling core being adapted to receive a signal for resetting said coupling cores into their "0" after completion of a logic operation; and circuit means for interconnecting said output windings of said input coupling cores, said control winding of said storage core and said input winding of said output coupling core to form a single coupling current loop.

14. A magnetic "AND" circuit comprising:

first and second magnetic storage cores each having a first and a second stable magnetic state;

a first and a second input and an output coupling magnetic core each said coupling core having a square loop magnetic characteristic loop with a first and a second stable magnetic state and being further characterized by an inherent shift in its magnetic characteristic loop such that the coercive force required to switch it into said first magnetic state is substantially less than the force required to switch it into said second state;

an input, an output and a reset winding on each of said first and said second input coupling cores;

a first and a second input winding, an output winding and a reset winding on said output coupling core;

a control winding on each of said storage cores;
first circuit means interconnecting the output winding of said first input coupling core, the control winding of said first storage core and the first input winding on said output coupling core to form a first coupling loop; and
second circuit means interconnecting the output winding of said second input coupling core, the control winding of said second storage core and the second input winding on said output coupling core to form a second coupling loop.

15. A magnetic "AND" circuit comprising:
first and second magnetic storage cores each having a first and a second stable magnetic state each said core being further characterized by an inherent shift in its magnetic characteristic loop such that the coercive force required to switch it into said first magnetic state is substantially greater than the force required to switch it into said second state;
a first and a second input and an output coupling magnetic core each said coupling core having a square loop magnetic characteristic loop with a first and a second stable magnetic state;
an input, an output and a reset winding on each of said first and said second input coupling cores;
a first and a second input winding, an output winding and a reset winding on said output coupling core;
a control winding on each of said storage cores;
first circuit means interconnecting the output winding of said first input coupling core, the control winding of said first storage core and the first input winding on said output coupling core to form a first coupling loop; and
second circuit means interconnecting the output winding of said second input coupling core, the control winding of said second storage core and the second input winding on said output coupling core to form a second coupling loop.

16. A magnetic "AND" circuit comprising:
first and second magnetic storage cores each having a square loop magnetic characteristic loop with a "0" and a "1" stable magnetic state, each said storage core being further characterized by an inherent shift in its magnetic characteristic loop such that the coercive force required to switch it into said "1" magnetic state is substantially less than the force required to switch it into said "0" state;
a first and a second input and an output coupling magnetic core each said coupling core having a square loop magnetic characteristic loop with a "0" and a "1" stable magnetic state and being further characterized by an inherent shift in its magnetic characteristic loop such that the coercive force required to switch it into said "0" magnetic state is substantially less than the force required to switch it into said "1" state;
an input, an output and a reset winding on each of said first and said second input coupling cores;
a first and a second input winding, an output winding and a reset winding on said output coupling core;
a control winding on each of said storage cores;
first circuit means interconnecting the output winding of said first input coupling core, the control winding of said first storage core and the first input winding on said output coupling core to form a first coupling loop; and
second circuit means interconnecting the output winding of said second input coupling core, the control winding of said second storage core and the second input winding on said output coupling core to form a second coupling loop.

17. A magnetic "AND" circuit comprising:
a plurality of magnetic storage cores each having a first and a second stable magnetic state;
a plurality of input coupling cores one associated with each said storage core, and an output coupling magnetic core, each said coupling core having a square loop magnetic characteristic loop with a first and a second stable magnetic state and being further characterized by an inherent shift in its magnetic characteristic loop such that the coercive force required to switch it into said first magnetic state is substantially less than the force required to switch it into said second state;
an input, an output and a reset winding on each of said input coupling cores;
a plurality of input windings, an output winding and a reset winding on said output coupling core;
a control winding on each of said storage cores;
circuit means interconnecting the control winding of each storage core, the output winding of its associated coupling core and one of said input windings on said output coupling core to form a plurality of coupling loops, the turn ratios of said winding being much that the presence of input signals of predetermined magnitude at the input windings of each of said input coupling cores will cause said output coupling core to be switched from said first to said second state, while the presence of said signals at less than all of said input windings will not cause said output coupling core to be switched.

References Cited

UNITED STATES PATENTS

| | | | |
|---|---|---|---|
| 3,110,613 | 11/1963 | Bean | 340—174 |
| 3,183,363 | 5/1965 | Batcher et al. | 340—174 |
| 3,204,223 | 8/1965 | Crane | 340—174 |
| 3,210,743 | 10/1965 | Kaenel | 340—174 |

BERNARD KONICK, Primary Examiner

BARRY L. HALEY, Assistant Examiner

U.S. Cl. X.R.

307—88